United States Patent [19]

Levey

[11] 3,930,568
[45] Jan. 6, 1976

[54] BAR STOCK SILENCER TUBE

[75] Inventor: Cyril D. Levey, South Euclid, Ohio

[73] Assignee: BTI Company, Cleveland, Ohio

[22] Filed: Aug. 29, 1974

[21] Appl. No.: 501,637

Related U.S. Application Data

[63] Continuation-in-part of Ser. No. 364,727, May 29, 1973, abandoned.

[52] U.S. Cl. ............... 193/38; 82/38 A; 138/149
[51] Int. Cl.² .................. B23B 25/00; B65G 11/16
[58] Field of Search ....... 82/38 A, DIG. 9; 138/149; 181/33 G, 33 M, 36 B, 62; 193/38–40; 226/196, 198, 199; 252/62; 302/64; 269/287; 214/1.5, 1.4, 1.3, 1.2, 1.1, 3

[56] References Cited
UNITED STATES PATENTS

| | | | |
|---|---|---|---|
| 570,169 | 10/1896 | Greenfield | 138/149 |
| 674,210 | 5/1901 | Loomis | 181/62 X |
| 2,308,307 | 1/1943 | Robinson | 302/64 X |
| 2,322,488 | 6/1943 | Uecker | 181/62 |
| 2,512,335 | 6/1950 | Kholos | 82/38 A |
| 2,534,811 | 12/1950 | Corlett | 193/38 |
| 2,857,931 | 10/1958 | Lawton | 138/149 X |
| 2,933,173 | 4/1960 | Lakins | 193/38 |
| 3,038,551 | 6/1962 | McCoy | 181/33 G |
| 3,087,570 | 4/1963 | Watters | 181/33 G |
| 3,087,572 | 4/1963 | Baruch | 181/33 G |
| 3,117,054 | 1/1964 | Antonucci | 181/33 G |
| 3,130,700 | 4/1964 | Peterson | 181/33 G |
| 3,563,825 | 2/1971 | Segura | 138/149 X |
| 3,665,968 | 5/1972 | DePutter | 138/149 X |
| 3,667,175 | 6/1972 | Bjorksten | 181/33 G X |
| 3,698,440 | 10/1972 | Matthieu | 252/62 X |

FOREIGN PATENTS OR APPLICATIONS

| | | | |
|---|---|---|---|
| 866,949 | 5/1961 | United Kingdom | 138/149 |

*Primary Examiner*—Evon C. Blunk
*Assistant Examiner*—James L. Rowland
*Attorney, Agent, or Firm*—McNenny, Farrington, Pearne & Gordon

[57] ABSTRACT

There is provided an improved bar stock feed tube characterized by its ability to reduce noise level. The tube structure is composed of inner and outer tubes defining an annular space therebetween, the annular space being sealed at each end and being filled with a particulate material, particularly metallic shot, e.g. lead.

2 Claims, 6 Drawing Figures

BAR STOCK SILENCER TUBE

This is a continuation-in-part application of my patent application Ser. No. 364,727, filed May 29, 1973, and now abandoned for BAR STOCK SILENCER TUBE.

BACKGROUND OF THE INVENTION AND PRIOR ART

With the advent of the Occupational Safety and Health Act (29 USC 651 et seq.), the National Institute of Occupational Safety and Health (NIOSH) has recently proposed noise standards for various industries. The proposal for machines retains the 90-decibel noise limit for equipment already in use but limits any new machines to an 85-decibel level. For comparative purposes, normal vocal effort at 6 inches from the ear is interfered with by a noise level of 72 decibels. Shouting at 6 inches from the ear is interfered with by a noise level of the order of 89–90 decibels. It has been determined that noise levels of 90 or above for prolonged periods can be hazardous to workers. Because of the logarithmic nature of sound intensity, a relatively small change in decibel rating represents a large change in the sound intensity.

A principal source of noise in industries utilizing machine tools is in connection with single and multiple spindle machines utilizing bar stock including rods of circular or polygonal cross section, e.g. hexagonal cross section. These rods are normally provided in lengths of from 12 to 21 feet. The workpiece end is generally inserted into a spindle sleeve having a collet member for gripping the workpiece adjacent the tooling. The free extremity of the bar stock is generally supported in a tubular member. Feeding may be effected either from the distal extremity of the supporting tube as shown in U.S. Pat. No. 2,608,746 to Harney or at the machine extremity in known manners. The bar stock in the course of the operations performed thereon at the collet extremity may be rotated at relatively high speed. Various forces working on the bar stock length cause the material to whip or oscillate within the supporting tube. The resulting noise level or intensity may be sufficient to cause injury to the ears of workers unless means are provided for reducing such noise level.

Prior art workers, notably Tessky in his U.S. Pat. Nos. 1,786,876, 1,891,290, and 1,935,999, Corlett U.S. Pat. No. 2,534,811, and Lakins U.S. Pat. No. 2,933,173, have shown structures which have sought to achieve reduction in the noise level for bar stock feed tubes to single or multiple spindle machines. In general, these structures have comprised a tubular body having disposed in concentric relation therewith spring materials (see the Tessky patents) or coiled sheaths wrapped with fabric, felt cloth, or material of such sort as a cushion between the OD of the coiled material and the ID of the supporting tube (see the Corlett patent). Lakins has shown a pair of concentrically disposed tubes defining an annular space therebetween which is filled with a viscous material of a putty-like nature consisting essentially of a mixture of metallic salts and oil.

The present invention is an improvement on these prior art structures and is capable of effecting reductions in decibel intensity ratings of from 2 to 6 or more decibels. These reductions are sufficient to bring the performance levels of the improved devices to or below the standards set by NIOSH.

BRIEF STATEMENT OF THE INVENTION

Briefly stated, the present invention is an improvement in the structure which is shown in the patent to Lakins U.S. Pat. No. 2,933,173 wherein the space between the inner and outer tubes is filled with a particulate material, particularly a shot metal and preferably lead. Improved results are also found if the outside surfaces of the inner and outer tubes, respectively, are coated with an elastomeric material, e.g. a vinyl halide coating or rubber coating. Still further, both the internal surface and the external surface of the outer tube may be coated along with the outer surface of the inner tube in still other embodiments. A preferred alternative embodiment exhibiting relatively high sound-absorbing performance and efficiency for a given total wall thickness comprises an assembly in which a fabric layer of predetermined thickness is wrapped in contact with the outer surface of the inner tube and the limited remaining space between the tubes is filled with lead shot. Also, the internal surface of the inner tube may be coated optionally for ground and finished bar stock with a coating such as nylon, Teflon, brass, or any softer metal. Such coating may also be hardened steel for heat-treated bar stock.

BRIEF DESCRIPTION OF THE DRAWINGS

This invention may be better understood by having reference to the annexed drawings wherein.

DETAILED DESCRIPTION OF THE DRAWINGS

Figure 2:
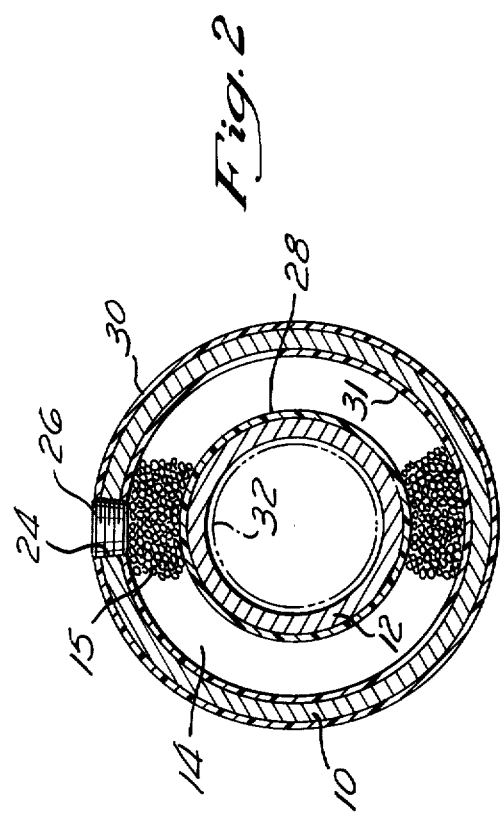
FIG. 2 is a transverse cross-sectional view of the bar stock feed tube shown in FIG. 1 as it appears in the plane indicated by the line 2—2.
Figure 1:
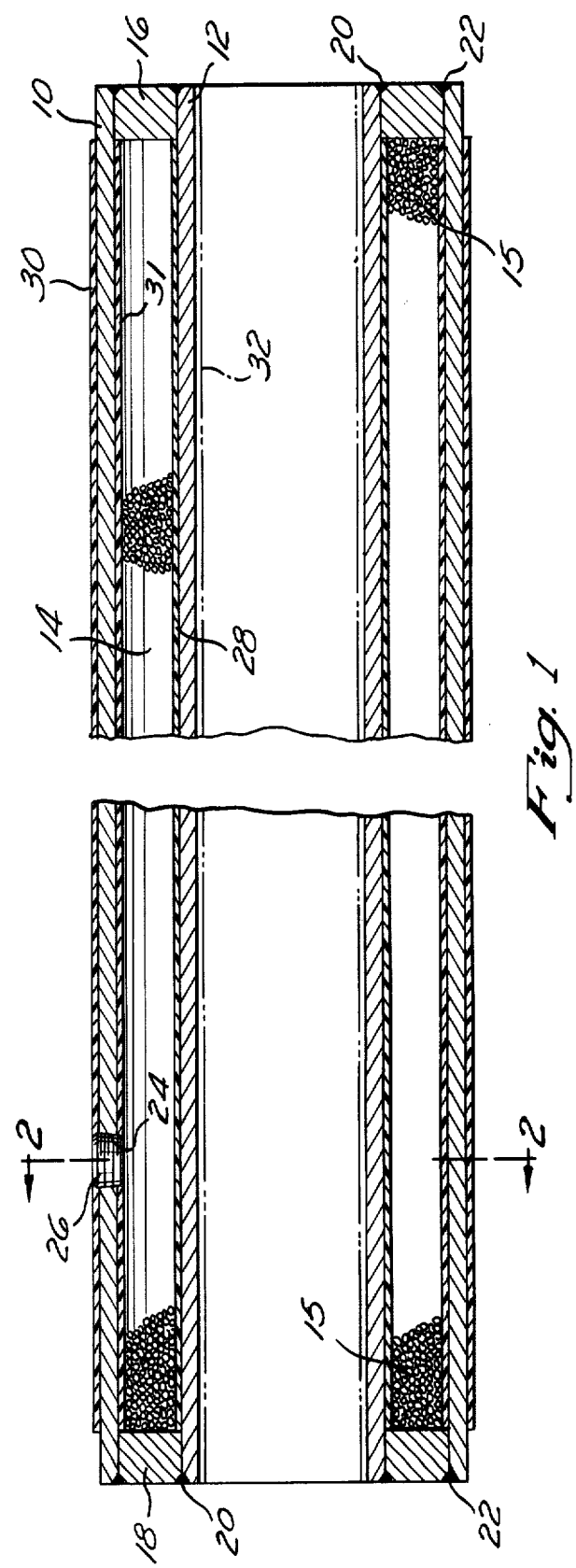
FIG. 1 is a cross-sectional view of a bar stock feed tube in accordance with the present invention.
Figure 3:
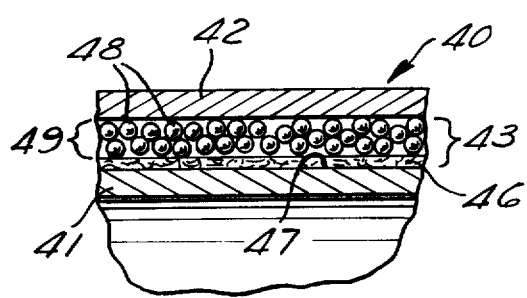
FIG. 3 is a fragmentary cross-sectional view, on an enlarged scale, of an alternative preferred embodiment of a bar stock feed tube in accordance with the invention.

Referring now more particularly to the annexed drawings, there is shown in FIGS. 1 and 2 an outer tube 10 and an inner tube 12 preferably although not essentially of equal length disposed in concentric relation and defining therebetween an annular space 14. The extremities of the tube are closed with annular closure members 16 and 18 suitably secured as, for example, by welding as at 20 and 22. In order to provide access to the closed annular space 14, there is conveniently provided a drilled port 24 having a removable flush plug 26 threadedly engaged therewith. Although only one port 24 and plug 26 is shown in FIG. 1, a second port and plug may be provided at the other end. The plug (or plugs) 26 is desirably flush with the surface of the outer tube to facilitate nesting of multiple sets of silencer tubes for a variety of sizes and to enable easy changing from one tube size to another. The annular space 14 is conveniently filled with a particulate material 15, preferably one having a relatively high density and being relatively soft. In other embodiments, the annular space may be filled before emplacement of the second annular closure member (16 or 18) and the port 24 and the plug 26 omitted. To this end, metallic shot particles are especially useful and, of those materials thus available for use, lead is the most satisfactory. Other soft metals such as zinc, soft iron (iron filings), brass, bronze, tin, etc., may be used. Nonmetallic particulate materials, e.g. Fuller's earth, dolomite, carbon, sand, clay (Attapulgus clay), or the like may be used. For best results, these particulate materials should have a substantially uniform particle size in the range of from 10 mesh to 30 mesh U.S. Standard Screen size. Best results have been secured with lead shot also known as number 12 lead shot having a particle size in the range of from 0.030 to 0.050 inch. While improved results may be obtained with the basic structure thus described above, still better results in respect of noise reduction are secured when the external surfaces of each of the tubes 10 and 12 and the internal surface of outer tube 10 are provided with an elastomeric coating, e.g. a vinyl halide coating. Thus the inner tube 12 is conveniently provided with a 3–20 mil coating 28 of poly(vinyl chloride) which may be deposited by any convenient method, e.g. dipping in plastisol and heating or applying granular vinyl chloride to the surface of the tube 12 heated to a temperature above the melting point of the resin. Rubber, e.g. poly(butadienestyrene) may also be used as a coating material and is conveniently applied in the latex form. In like manner, a coating 30 is also provided on the outer surface of outer tube 10. Also, it is desirable and convenient to coat similarly the inner surface of tube 10 as with coating 31. The tubes 10 and 12 and the closures 16 and 18 are conveniently formed of steel, the same material heretofore used in the fabrication of devices shown by Lakins.

As indicated above, the inner surface of the inner tube 12 may also be coated with a relatively softer material such as nylon, e.g. Nylon 66, Teflon (polytetrafluoroethylene), polyethylene, polypropylene, brass, bronze, zinc, especially where ground and finished bar stock is the material being fed to the spindle of the machine tool. This coating will serve to protect the bar stock from damage by the supporting tube. This coating 32 is shown in FIG. 1 in phantom since it is an optional feature. Also as indicated above, the inner surface may be provided with a hardened steel liner of one or multiple pieces for heat-treated stock.

Further noise reduction may be experienced in the machine tools themselves wherein the spindle portion extending through the head stock of the machine is formed from tubular members having generally the same structure as the bar stock feed tubes of the present invention. These tubes, particularly those without projecting plugs 26, lend themselves quite readily to telescopic relationship with larger diameter tubes and, thus, the machine may be rendered more able to accommodate a family of tube sizes built up in the manner described above and nested one within the other in the spindle portion of the machine.

For comparative purposes, a prior art structure with various sizes of bar stock has been compared with a corresponding size structure in accordance with the present invention and the sound level determined in decibels for each. It will be observed that in the case of the present structure, lower decibel readings are obtained throughout most of the range of speeds, the difference being of the magnitude mentioned above.

TABLE I

| Tube Size Rod Size | Decibel Readings at Different Speeds | | | |
|---|---|---|---|---|
| | 2¾ × 2⅛ 2″ | 2¾ × 2⅛ 2″ | 2¾ × 2⅛ 1⅞ | 2¾ × 2⅛ 1⅞ |
| Clutch Setting | Prior Art Structure | Invention Structure | Prior Art Structure | Invention Structure |
| 00 | 77 | 76.5 | 77 | 77 |
| 02 | 77 | 76 | 78 | 75.5 |
| 04 | 78 | 76 | 78.5 | 75.5 |
| 06 | 79 | 79 | 79 | 76 |
| 08 | 78.5 | 77 | 79.5 | 77 |
| 10 | 77.5 | 77.5 | 80 | 77.5 |
| 12 | 79 | 77.5 | 79 | 77 |
| 14 | 80 | 79 | 83 | 80 |
| 16 | 81 | 78.5 | 82 | 78.5 |
| 18 | 81 | 84 | 82.5 | 80.5 |
| 20 | 82.5 | 84 | 83.5 | 79 |
| 22 | 83 | 82.5 | 82 | 80 |
| 24 | 84.5 | 83 | 83.5 | 80 |
| 26 | 87 | 81.5 | 84 | 81 |
| 28 | 85.5 | 83.5 | 88.5 | 82.5 |
| 30 | 84.5 | 83 | 88.5 | 85.5 |
| 32 | 87.5 | 83.5 | 88.5 | 85.5 |
| 34 | 86.5 | 86 | 89.5 | 86 |
| 36 | 89 | 86.5 | 87.5 | 88 |
| 38 | 89.5 | 89 | 89 | 89.5 |
| 40 | 89.5 | 91 | 89.5 | 86 |
| 42 | 90 | 88.5 | 86 | 83 |
| 44 | 93 | 89.5 | 88 | 85 |
| 46 | 86 | 89 | 82 | 84.5 |
| 48 | 88.5 | 90 | 82.5 | 84 |

In the foregoing table, the tube sizes indicate the inner and outer I.D.'s, and the rod size indicates the diameter of the workpiece rod being tested. The clutch setting is for high speed. The characteristics of the machine determine the speed in rpm at each clutch setting. For comparative purposes, a high clutch setting of 00 is equivalent to 261 rpm, 12 equals 434 rpm, 24 is 726 rpm, 36 is 1208 rpm, and 48 is 2014 rpm. It will be noted that the second and fourth columns which represent embodiments of the present invention are generally less in decibel reading than the results shown in the first and third columns which represent prior art embodiments. As one proceeds down the scale toward higher speeds and hence higher decibel readings, there will be a point where the prior art device will show readings slightly less than the readings for the present structure. The reason for this is that at this point a harmonic of the entire system has been reached, and maximum noise is experienced. In the same manner, the prior art structures also experience harmonics at different points, however. These points correspond to those points where the maximum difference between the present structure and the prior art structure is experienced.

Referring now to a preferred embodiment illustrated in FIGS. 3–6, a sound attenuating bar stock feed tube 40 includes an elongated cylindrical inner tube 41, preferably of steel, and an outer cylindrical tube 42, also preferably of steel, concentrically disposed about the inner tube. The inside diameter of the outer tube 42 is somewhat larger than the outside diameter of the inner tube 41 so that an annular space 43 is formed between these elements. The tubes 41 and 42 are held in their concentric relation and the annular space 43 is closed at its ends by means of an annular weld bead, for example, extending radially between the end faces of the tubes.

A layer of fabric 46 is wrapped in contact with substantially the entire outer surface, designated 47, of the inner tube 41. A fabric material which has been found to be particularly suited for this application is woven cotton webbing in the form of a 2-inch wide strip spirally wound about the inner tube and taped or glued thereto at its ends. The portion of the annular space 43 not occupied by the fabric layer 46 is filled with lead shot 48 forming a layer 49.

Preferably, in assembly of the tube 40, the inner tube 41 is cut to a desired length and wrapped with the fabric layer 46 of suitable thickness. The inner tube with this fabric wrapping is then inserted within the outer tube 42 of substantially the same length and while these elements are held in concentric relation by suitable fixtures, a weld bead 44 is formed at each end of the tube 40. Subsequent to this tube closure operation, the lead shot 48 is poured or otherwise directed into the annular space 43 through a hole (not shown) equivalent to the flush plug 26 of the embodiment of FIGS. 1 and 2. Movement of the lead shot 48 into the annular space 43 may be assisted by a mechanical vibrator in contact with the outer tube 42.

Tests of various arrangements have revealed a critical range of thickness of the layer 49 of lead shot 48 for a relatively high degree of sound attenuation to be in the area of approximately 0.090 to 0.120 inches. Use of a lesser volume of lead leads to a proportionate loss in sound attenuation performance while a greater volume has a diminishing sound attenuating effect for a unit increase in volume. Besides having lessened sound attenuating effectiveness, additional volume of lead shot 48 greatly adds to the weight of a given tube assembly 40 making it more difficult and less feasible to handle and at the same time significantly increases its cost.

It has been found that number 12 lead shot having a nominal diameter of approximately 0.040 inch is ideal for this application being of satisfactory size for handling and loading into the annular space 43 and providing a satisfactory density in a radial clearance of between 0.090 and 0.120, giving roughly between 2 to 3 courses of shot balls in such a radial clearance space. With the assembly shown in FIG. 3 wherein the inner tube 41 is covered directly by the cloth layer 44 and where a particulate lead layer of 0.090 to 0.120 inch is provided, sound attenuation is even greater than that achieved with the embodiments disclosed in connection with FIGS. 1 and 2 with the reduction being from 85 db in connection with the embodiments of FIGS. 1 and 2 to 83 db for the embodiment of FIGS. 3 through 6.

Figure 4:
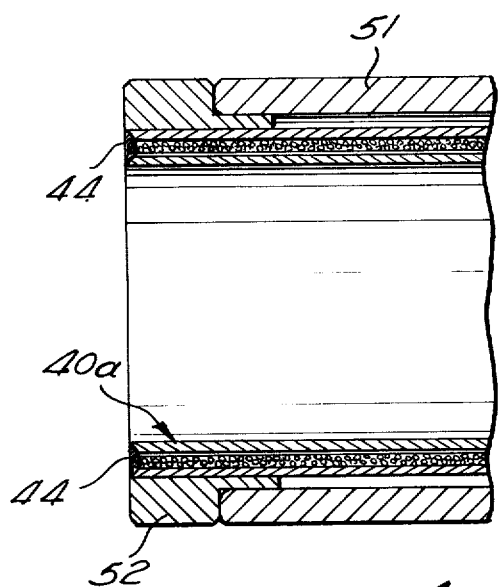
FIG. 4 is a cross-sectional view of one end of a bar stock feed tube, employing the structure of FIG. 3, concentrically mounted within a master tube.
Figure 5:
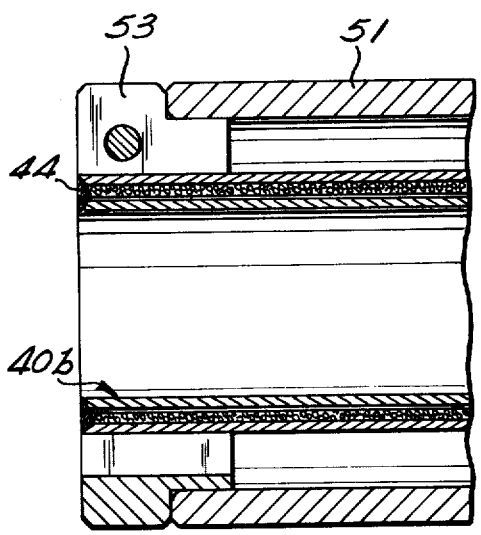
FIG. 5 is a view similar to FIG. 4 showing the preferred bar stock feed tube with an intermediate size stock capacity.
Figure 6:
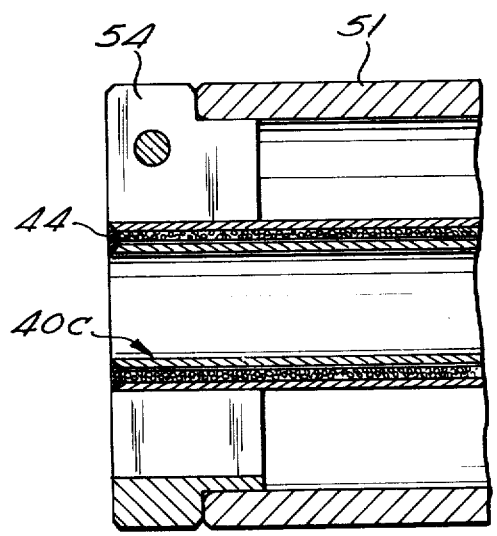
FIG. 6 is a view similar to FIG. 4 showing the preferred bar stock feed tube with a relatively small size stock capacity.

FIGS. 4–6 illustrate the tube assembly 40 in various diameter sizes, each mounted in a common size of master tube 51 which normally may be provided as original equipment in a bar stock loading device for feeding single or multiple spindle machines. As illustrated in these FIGS. 4–6, suitably dimensioned collars 51 through 53 are provided to support tubes 40*a*, *b*, and *c* of varying diameters concentrically within the master tube 51. Study of FIGS. 4–6 reveals that the sound control stock feed tubes 40*a*–*c*, although of various size capacity, i.e. the inside diameter of the inner tube 41, may all be conveniently made with a common nominal one-quarter inch wall. With this relatively thin wall thickness, not only may the critical range of lead layer thickness at 49 be employed but the assemblies 4*a* through *c* lend themselves to ready nesting within one another, and within most standard master tubes of existing equipment and most standard adaptor tubes, the latter being adapted to be removably positioned within master tubes to reduce their size capacity. This nesting capability follows from the dimensional unit in the English system of one-fourth inch as a common standard used by machine tool manufacturers.

To produce this desired total quarter inch wall thickness, it has been found to be particularly convenient to use nominal 0.0625 inch wall thicknesses for the inner and outer tubes 41 and 42 and to wrap the inner tube with one ply of 0.020 inch woven cotton webbing such as the webbing used for commercial safety belts and harnesses worn by personnel. The difference between these wall thicknesses and the total ¼ inch wall thickness is taken up by the lead layer 49. This construction results in the use of a lead layer within the limits of the critical range presented above. Of course, various other wall thicknesses for the inner and outer tubes may be employed and various thicknesses and plies of the fabric layer 46 may be used in combination to provide the critical range of the lead layer dimension. The term fabric is used here to denote a nonmetallic material which is knitted, woven, felted, or otherwise formed into a discontinuous mass capable of damping sound energy.

What is claimed is:

1. A sound attenuating bar stock feed tube comprising in combination an elongated inner tube, the inner tube including on its exterior a covering of non-metallic sound-absorbing material, a concentrically disposed elongated outer tube having an internal diameter greater than the external diameter of the inner tube to thereby define with the inner tube an annular space, closure means for said annular space at each end, a layer of lead shot in said annular space, said lead layer having a thickness of between approximately 0.090 to 0.120 inches, said layer of lead shot being formed of a particle size in the range of approximately 0.030 to 0.050 inch whereby it forms a loose layer of between 2 and 3 courses of particles.

2. A sound attenuating bar stock feed tube comprising in combination an elongated inner cylindrical feed tube, an outer cylindrical tube concentric about and of substantially the same length as said inner tube, said outer tube having an inner diameter greater than the diameter of an outer surface of the inner tube whereby an annular space is formed between the inner and outer tubes, closure means at each end of said annular space, at least one layer of woven fabric in contact with and wrapped about said outer surface of said inner tube, the thickness of said woven fabric layer being selected in relation to the outside diameter of said inner tube and the inside diameter of said outer tube to leave a radial clearance zone in said annular space of about 0.090 to 0.120 inch between said fabric layer and the inside surface of said outer tube, a layer of lead shot in said annular space, said shot being provided with a particle size in a range of about 0.030 to 0.050 inch whereby it forms a sound-absorbing layer of approximately 2 to 3 courses of loose particles.

* * * * *